(12) United States Patent
Laurens et al.

(10) Patent No.: US 7,506,402 B2
(45) Date of Patent: Mar. 24, 2009

(54) ARRANGEMENT FOR SELF-RELEASING CONNECTION OF A WINDSCREEN WIPER ARM ON A DRIVING SHAFT

(75) Inventors: Romain Laurens, Clermont-Ferrand (FR); Karim Brazi, Issoire (FR)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 11/793,220

(22) PCT Filed: Dec. 13, 2005

(86) PCT No.: PCT/EP2005/013334

§ 371 (c)(1),
(2), (4) Date: Jun. 18, 2007

(87) PCT Pub. No.: WO2006/063781

PCT Pub. Date: Jun. 22, 2006

(65) Prior Publication Data

US 2008/0022475 A1    Jan. 31, 2008

(30) Foreign Application Priority Data

Dec. 17, 2004   (FR) .................................. 04 13475

(51) Int. Cl.
*B60S 1/34* (2006.01)

(52) U.S. Cl. .................. 15/250.34; 15/250.31; 464/30; 464/37; 464/45; 464/101

(58) Field of Classification Search ............. 15/250.34, 15/250.31, 250.3, 250.351, 250.352; 74/599, 74/600; 464/30, 37, 45, 100, 101, 60, 57, 464/58, 59, 77

See application file for complete search history.

(56) References Cited

U.S. PATENT DOCUMENTS

| 2,826,903 | A |   | 3/1958 | Gerstung et al. |
|---|---|---|---|---|
| 4,006,787 | A | * | 2/1977 | Rumpp et al. ................ 173/132 |
| 4,610,340 | A | * | 9/1986 | Helmes et al. ............. 192/56.5 |
| 4,947,508 | A | * | 8/1990 | Bauer et al. ............ 15/250.352 |
| 5,495,637 | A | * | 3/1996 | Egner-Walter ......... 15/250.351 |
| 6,026,536 | A |   | 2/2000 | Miller et al. |
| 6,116,579 | A | * | 9/2000 | Aldridge et al. ............. 254/323 |

FOREIGN PATENT DOCUMENTS

GB          743720 A     1/1956
JP          62-273147    * 11/1987

\* cited by examiner

*Primary Examiner*—Gary K Graham
(74) *Attorney, Agent, or Firm*—Osha • Liang LLP

(57) ABSTRACT

A disengageable arrangement for connecting a windscreen-wiper arm to a drive shaft driven in rotation about its longitudinal axis has a device solidly attached to the arm and providing the connection of the arm, and the drive shaft in the normal operating position of the windscreen wiper. The device is deformable under an effect of a torque applied to the arm greater than that exerted by said drive shaft, and is capable of being placed back in the normal operating position by locked relative positioning of the arm and the drive shaft. There is a single locked relative position of the arm and the drive shaft. The deformable device has at least two stacked elastic blades. The ends of each stacked elastic blade solidly are attached to the arm. Each of the at least two stacked elastic blades has a locking part inserted in a stopping part solidly attached to the drive shaft.

8 Claims, 2 Drawing Sheets

ARRANGEMENT FOR SELF-RELEASING CONNECTION OF A WINDSCREEN WIPER ARM ON A DRIVING SHAFT

The invention relates to a disengageable arrangement for connecting a windscreen-wiper arm on a drive shaft.

A motor vehicle windscreen-wiper arm is usually connected to a drive shaft powering its pivoting movement in the wiping range of the window, the longitudinal axis of the arm being substantially perpendicular to the rotational axis of the drive shaft. Furthermore, in order to access the blade held by the arm, this arm can pivot in a plane substantially perpendicular to the window, essentially for the purpose of verifying or changing the blade. The windscreen wiper can comprise an arm head mounted on the drive shaft and on which the arm itself hinges in order to pivot in said plane substantially perpendicular to the window.

Under certain conditions, for example when washing the motor vehicle with rollers, or when there is ice or snow on the window, the arm can be subjected to a significant torque tending to cause it to pivot about the rotational axis of the drive shaft, this torque being greater than the torque exerted by the drive shaft. The can result in damage or even breakage of the arm or head.

In order to solve this problem, U.S. Pat. No. 6,026,536 provides a disengageable arrangement for connecting a windscreen-wiper arm to a drive shaft.

In this prior arrangement, the end of the arm is equipped with an elastic device solidly attached to the arm and made up of a plurality of elastic branches parallel to the rotational axis of the drive shaft and coming into contact with the peripheral stopping parts supported by the drive shaft and distributed around it. These branches are surrounded by an open ring. When applying a certain pivoting torque to the arm, the drive shaft being immobile, the ring opens and releases the majority of the branches, which expand and exit their stopping position, allowing the windscreen-wiper arm to pivot.

Such a known arrangement has the following technical problems.

It requires manufacturing a drive shaft of a specific shape with a part machined with said peripheral stopping parts. Furthermore, the majority of the elastic branches must be solidly attached to the arm. Moreover, during assembly, this arrangement comprises said ring, which is a separate part capable of being incorrectly assembled or even forgotten. Such a disengageable connector arrangement therefore involves relatively complex manufacturing and assembly.

Once the arrangement is disengaged, the arm can turn about the drive shaft until no more torque is applied and it then locks in this final position. This results in a manipulation of the arm being necessary to return the arm to the initial position where it is capable of functioning correctly. This manipulation is not easy, there being several possible relative locked positions, taking into account the plurality of branches and stopping parts.

The invention solves these technical problems and, for this purpose, provides a disengageable arrangement for connecting a windscreen-wiper arm to a drive shaft driven in rotation about its longitudinal axis, comprising a device solidly attached to the arm and providing the connection of the arm and the drive shaft in the normal operating position of the windscreen wiper, this device being deformable under the effect of a torque applied to the arm tending to cause it to pivot about the rotational axis of said drive shaft, when this drive shaft is immobile, and capable of being placed back in the normal operating position by locked relative positioning of the arm and the drive shaft, characterized in that there is a single relative locked position of the arm and the drive shaft In a preferred embodiment of the invention, said deformable device comprises at least one elastic blade, at least one end of which is solidly attached to the arm and a locking part of which fits into a stopping part solidly attached to the drive shaft.

Said stopping part is preferably arranged on a sleeve solidly attached to the drive shaft.

In one specific embodiment, said elastic blade is solidly attached to the arm at both ends and said locking part is a V-shaped folded part.

Said elastic blade is advantageously a metallic spring leaf.

The invention also relates to a windscreen wiper equipped with an arrangement as detailed above, characterized in that said deformable device is housed in an arm head, mounted on the drive shaft and on which the arm itself hinges, so as to be able to pivot in a plane substantially perpendicular to the window.

The invention is described in more detail below in reference to figures which do not show a preferred embodiment of the invention.

Figure 1:
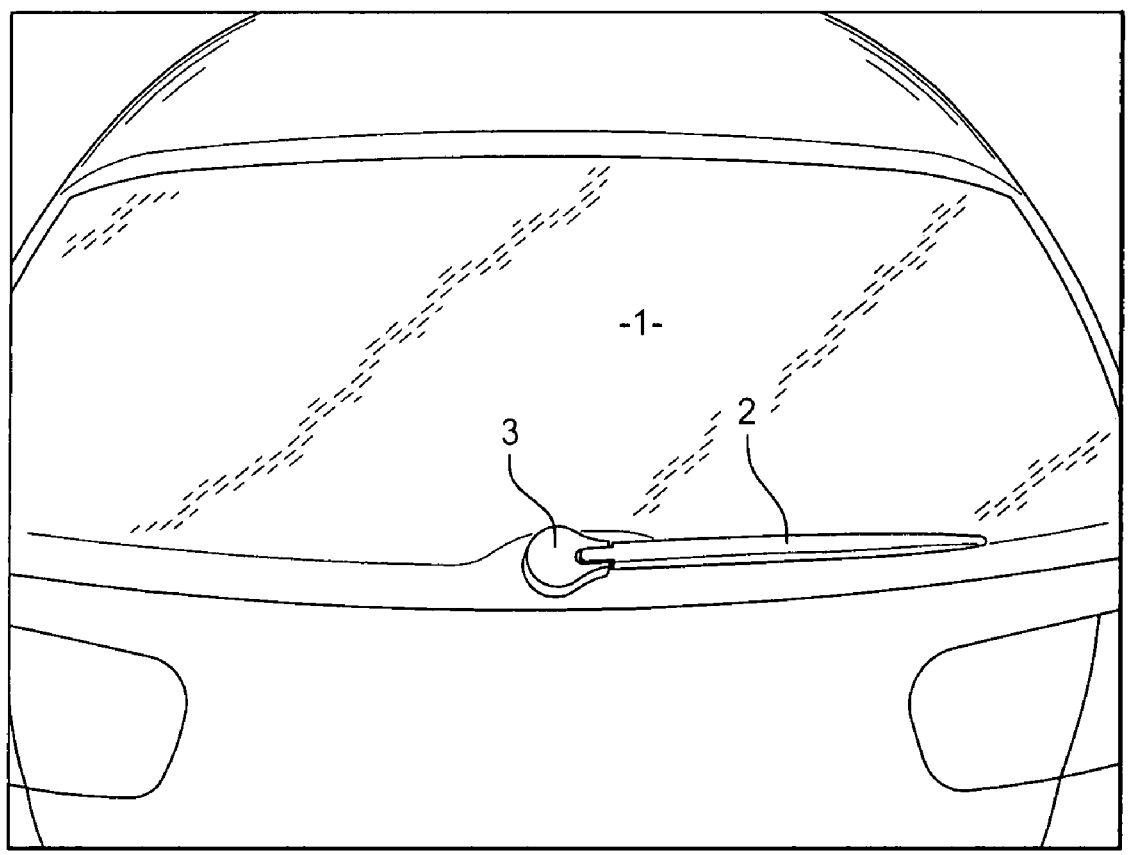
FIG. 1 shows a rear windscreen of a motor vehicle equipped with a windscreen wiper according to the invention.

FIG. 1 shows a rear windscreen 1 of a motor vehicle equipped with a windscreen wiper comprising an arm 2, supporting a blade, and an arm head 3, mounted on a drive shaft and on which the arm 2 itself hinges in order to pivot in a plane substantially perpendicular to the window 1.

Figure 2:
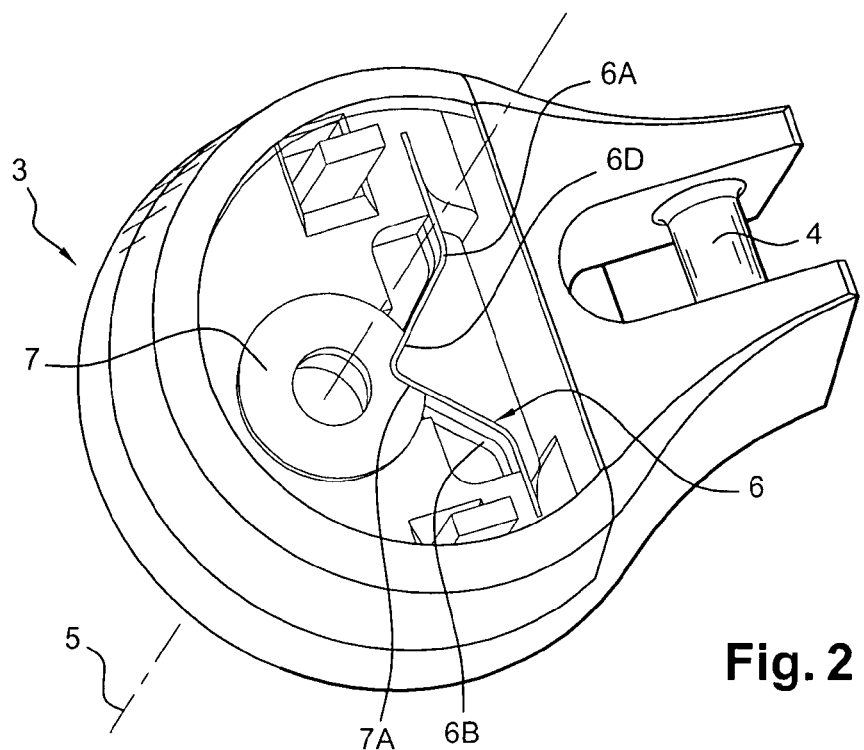
FIG. 2 shows a perspective view of a windscreen-wiper arm head equipped with a disengageable connector arrangement according to the invention.

FIG. 2 shows a perspective view of the arm head 3 in the normal operating position.

This arm head 3 comprises a pin 4 on which the arm itself is hinged so as to pivot in a plane substantially perpendicular to the window.

A disengageable arrangement for connecting the windscreen-wiper arm to the drive shaft driven in rotation about its longitudinal axis 5 is housed in this arm head. This arrangement comprises a device 6 solidly attached to the arm and providing the connection of the arm and the drive shaft in the normal windscreen wiper operating position. This device is deformable under the effect of a torque applied to the arm and tending to cause it to pivot about the rotational axis 5 of the drive shaft, when this drive shaft is immobile, and can be repositioned in the normal operating position by the single locked relative positioning of the arm and the drive shaft.

The deformable device 6 comprises two stacked elastic blades 6A, 6B, each consisting of a metallic spring leaf. These blades are solidly attached to the arm head at both ends and comprise a locking part 6C made up of a V-shaped folded part. This locking part is inserted in a stopping part 7A consisting of a correspondingly V-shaped cavity and arranged on a sleeve 7 solidly attached to the drive shaft and slidingly mounted on the arm head.

The arm head 3 shown in FIG. 2 is advantageously covered by a lid protecting the arrangement in an aesthetically pleasing manner.

Figure 3:
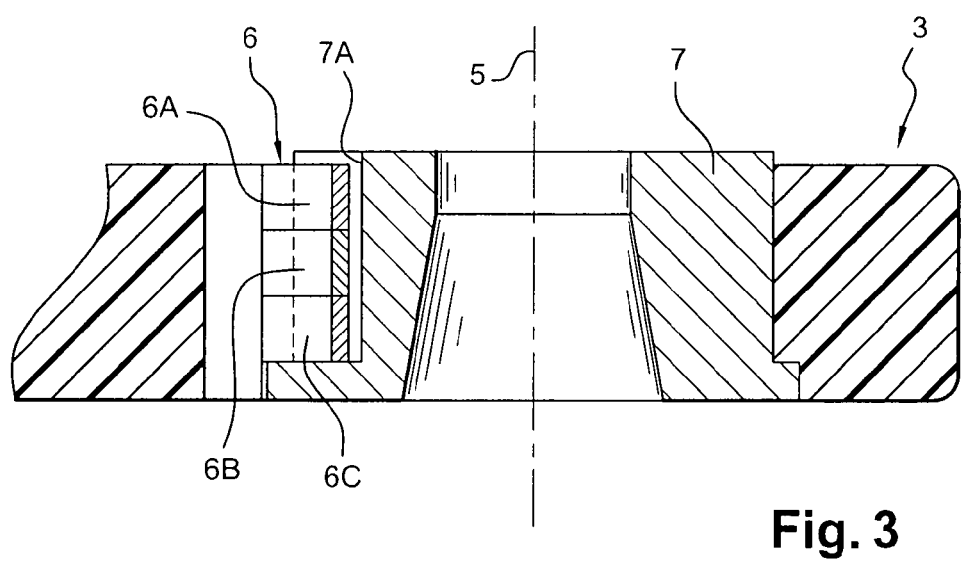
FIG. 3 shows a schematic view of a longitudinal section of such an arm head.

FIG. 3 shows a cross-section of a similar arrangement.

In this case, the deformable device 6 comprises three stacked elastic blades 6A, 6B, each consisting of a metallic spring leaf. Their V-shaped locking part is inserted in the stopping part 7A consisting of a correspondingly V-shaped cavity and arranged on the sleeve 7 solidly attached to the drive shaft and slidingly mounted on the arm head 3.

The invention is described above according to a preferred embodiment thereof. Other embodiments which are not specifically described also come into the scope of the invention.

It goes without saying that the application applies to any type of motor vehicle windscreen, front or rear.

The invention also applies to a windscreen-wiper arm with no arm head. In this case, the disengageable connector arrangement is directly mounted on the end of the arm.

In this specifically described embodiment, the number of elastic blades is chosen in relation to the minimum value of the disengaging torque and the resistance of said blades.

A deformable plastic element, such as a clip or a blade, can be used.

A system using Belleville spring washers, jaw clutches, magnets or spring-loaded balls can be used as a deformable device.

The disengageable connector arrangement can be arranged at a connection area other than the end of the drive shaft, for example on the drive control gear.

The invention claimed is:

1. A disengageable arrangement for connecting a windscreen-wiper arm to a drive shaft driven in rotation about its longitudinal axis, comprising
    a device solidly attached to the arm and providing the connection of the arm and the drive shaft in the normal operating position of the windscreen wiper,
    the device being deformable under an effect of a torque applied to the arm greater than that exerted by said drive shaft, and capable of being placed back in the normal operating position by locked relative positioning of the arm and the drive shaft,
    wherein there is a single locked relative position of the arm and the drive shaft, and
    wherein said deformable device comprises at least two stacked elastic blades, the ends of each stacked elastic blade are solidly attached to the arm, and each of the at least two stacked elastic blades comprises a locking part inserted in a stopping part solidly attached to the drive shaft.

2. The arrangement according to claim 1, wherein said stopping part is arranged on a sleeve solidly attached to the drive shaft.

3. The arrangement according to claim 2, wherein said elastic blade is solidly attached to the arm at both ends and said locking part is a V-shaped folded part.

4. The arrangement according to claim 2, wherein said at least two elastic blades are metallic spring leaves.

5. The arrangement according to claim 1, wherein said elastic blade is solidly attached to the arm at both ends and said locking part is a V-shaped folded part.

6. The arrangement according to claim 1, wherein said at least two elastic blades are metallic spring leaves.

7. A windscreen wiper equipped with an arrangement according to claim 1, wherein said deformable device is housed in an arm head mounted on the drive shaft and on which the arm itself hinges, so as to be able to pivot in a plane substantially perpendicular to the window.

8. A windscreen wiper equipped with an arrangement according to claim 1, wherein said deformable device is housed in an arm head, mounted on the drive shaft and on which the arm itself hinges, so as to be able to pivot in a plane substantially perpendicular to the window.

* * * * *